United States Patent Office 3,464,852
Patented Sept. 2, 1969

3,464,852
POLYESTER ARTICLE COATED WITH A CURED, CROSS-LINKED POLYESTER DERIVED FROM (a) AT LEAST ONE POLYHYDRIC ALCOHOL (b) AT LEAST ONE DICARBOXYLIC COMPOUND AND (c) A POLY(OXYETHYLENE) ALCOHOL
John R. Caldwell and Russell Gilkey, Kingsport, Tenn., assignors to Eastman Kodak Company, Rochester, N.Y., a corporation of New Jersey
No Drawing. Continuation of application Ser. No. 350,539, Mar. 9, 1964. This application Oct. 16, 1968, Ser. No. 769,475
Int. Cl. C08d 13/24; C09d 3/64
U.S. Cl. 117—138.8                                14 Claims

---

ABSTRACT OF THE DISCLOSURE

A polyester article is provided with a hydrophilic surface by treating said article with an unsaturated polyester derived from (A) at least one polyhydric alcohol, (B) at least one dicraboxylic compound, and (C) a poly(oxyethylene) alcohol.

---

This application is a continuation of Caldwell and Gilkey U.S. Ser. No. 350,539, filed Mar. 9, 1964, now abandoned.

This invention relates to the treatment of articles prepared from linear polyester resins such as poly(ethylene terephthalate) to provide thereon a hydrophilic surface coating.

More particularly, this invention relates to shaped polyester articles such as films, fibers, and the like having applied thereto a relatively thin coating or layer of a specific polymerized polyester resin of the alkyd type whereby there is provided a member having improved resistance to soiling by oily dirt, which is more readily wettable, and which possesses other improved properities.

This invention is directed to novel resinous reaction products which are polymerizable unsaturated polyester resins derived from certain poly(oxyethylene) glycol derivatives and to polyester articles such as poly(ethylene terephthalate) provided with a surface coating of the polymerized or cured form thereof.

Polyester articles treated in accordance with this invention resist to a substantial degree soiling by oily dirt and are more readily wettable. The imparting of wettability characteristics to hydrophobic polyester members is beneficial in a number of ways. For instance, it is desirable for undergarments to be able to wick away water from the body for more efficient evaporation and greater comfort. A polyester fiber having a wettable surface aids in this wicking action. A wettable polyester film can be used in overlay film applications for tracing with water-based inks. By incorporating in the surface coating of this invention from 5% to 50% by weight, based on the weight of the resinous reaction product, of a finely divided inert material such, for example, as silica, it is possible to obtain a coating on a polyester member which can be marked with a pencil. In addition, the coating of this invention, when applied to poly(ethylene terephthalate) film base, provides for improved adhesion of subsequently applied gelatin layers, poly(vinyl alcohol) layers and the like.

For a complete understanding of this invention, reference is made to the following detailed description.

The resinous reaction products of this invention are derived from a condensation reaction of a poly(oxyethylene) glycol derivative (to be detailed more fully hereinafter), at least one polyhydric alcohol, and at least one polycarboxylic acid. The anhydride of the polycarboxylic acid and the esters thereof can be substituted for all or a portion thereof, if desired. If the esters are employed the reaction is carried out in the presence of an ester interchange catalyst such as litharge, titanium tetra isopropoxide, dibutyl tin oxide, and zinc acetate.

The reaction is carried out at elevated temperatures of the order of from about 180° C. to 250° C. for prolonged periods of time and preferably until an acid number of from about 0 to 50 is obtained. The period of time required will usually be from about 2 to 6 hours.

The poly(oxyethylene glycol) derivatives employed in the preparation of the novel resinous reaction products of this invention have the structural formula

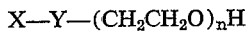

wherein $n$ is an integer of 5 or more and preferably an integer from 10 to 100, and Y is selected from the group consisting of —O—, —S—, =N—, and

X is an organic radical containing from 1 to 40 carbon atoms and 0, 1 or more heteroatoms such as O, N, S, Cl, Br, and F such heteroatoms being combined so that the resulting groups are nonfunctional; that is, unreactive with diol, acid, ester, or carbon-carbon unsaturation under esterification or ester interchange conditions as defined hereinafter. The hydrocarbon portion of the organic radical is selected from the group consisting of each of or any combination of alkyl such, for example, as methyl, ethyl, propyl, isopropyl, butyl, lauryl, palmityl, stearyl, and oleyl; aryl such as phenyl and naphthyl; and cycloalkyl such as cyclohexyl, abietyl, norbornyl, and dihydroabietyl. One of the many possible combinations of hydrocarbon radicals is alkylaryl such, for example, as methylphenyl, ethylphenyl, hexylphenyl, octylphenyl, nonylphenyl, dodecylphenyl, and isopropylnaphthyl.

Specific examples of poly(oxyethylene) glycol derivatives that can be used in carrying out this invention include octylphenoxy polyethoxy ethanol containing about 30 ㅡ(CH₂CH₂O)ㅡ units, octyl phenoxy polyethoxy ethanol containing about 40 ㅡ(CH₂CH₂O)ㅡ units, the polyethylene glycol ether of hydroabietyl alcohol, stearamide poly(oxyethylene) ethanol, dodecylphenoxy polyethoxy ethanol, and lauryl polyethoxy ethanol.

A particularly suitable polymerizable unsaturated polyester resin for use in carrying out this invention is derived by the condensation reaction of about 1 mole of a poly(oxyethylene) glycol derivative as above defined, from about 0.2 mole to 100 moles of a dihydric alcohol, and from about 0.2 mole to 100 moles of an α,β-ethylenically unsaturated dicarboxylic acid or anhydride thereof. The molar porportions of dihydric alcohol and unsaturated acid employed will be substantially the same. Thus, for example, when 2 moles of dihydric alcohol are used, about 2 moles of acid are used. The amount of poly(oxyethylene glycol) derivative used is equivalent to about 15% to 90% and preferably 40% to 70% by weight of the resulting unsaturated polyester.

The preferred dihydric alcohols contain from 2 through 20 carbon atoms and have no other reactive group than the hydroxyl groups. Examples of suitable dihydric alcohols include ethylene glycol, 1,2-propylene glycol, 1,4-butanediol, diethylene glycol, triethylene glycol, 1,6-hexanediol, 2,2-dimethyl-1,3-propylene glycol, 1,4-cyclohexane-dimethanol, 4,4' - methylenebis(cyclohexanedimethanol), and 2,2,4,4-tetramethyl - 1,3 - cyclobutanediol. Mixtures of two or more dihydric alcohols can be used if desired. Small amounts of up to about 20 mole percent of polyhydric alcohols such as glycerol and pentaerythritol can be substituted for a portion of the dihydric alcohol.

Specific examples of α,β-ethylenically unsaturated dicarboxylic acids and anhydrides that can be employed include maleic acid, maleic anhydride, fumaric acid, itaconic acid, itaconic anhydride, citraconic acid, citraconic anhydride, and mesaconic acid. Cyclohexene - 1,2 - dicarboxylic acid, bicycloheptene - 2,3 - dicarboxylic acid and their anhydrides are also suitable. The esters of the above acids can be used if desired and include dimethyl maleate, diethyl maleate, dimethyl fumarate, and diethyl fumarate. If the esters are used, an ester interchange catalyst is employed in carrying out the reaction.

In the preparation of the polymerizable unsaturated polyester, the $\alpha,\beta$-ethylenically unsaturated dicarboxylic acid can be replaced with up to about 50 mole percent of a saturated aliphatic dicarboxylic acid having from 4 to 12 carbon atoms per molecule, alicyclic dicarboxylic acid, or aryl dicarboxylic acid or anhydride such, for example, as succinic acid, adipic acid, sebacic acid, pimelic acid, suberic acid, azelaic acid, glutaric acid, o-phthalic acid, phthalic anhydride, isophthalic acid, terephthalic acid, cyclohexane-1,4-dicarboxylic acid, cyclohexane-1,3-dicarboxylic acid, naphthalene dicarboxylic acid, methylene-dibenzoic acid, diphenic acid, bicycloheptane-2,3-dicarboxylic acid, and mixtures of two or more. The esters of the above enumerated acids can be used if desired.

Another highly satisfactory polymerizable unsaturated polyester that can be employed in carrying out this invention is derived by the condensation reaction of about 1 mole of a poly(oxyethylene glycol) derivative as above described, from about 0.2 mole to 100 moles of a dihydric alcohol consisting of allyl esters of polyhydric alcohols, and from about 0.2 mole to 100 moles of a saturated aliphatic dicarboxylic acid, alicyclic dicarboxylic acid, aryl dicarboxylic acid, and mixtures thereof. The molar proportions of the dihydric alcohol and acid employed will be substantially the same. The amount of poly(oxyethylene glycol) derivative used is equivalent to about 15% to 90% and preferably 40% to 70% by weight of the resulting unsaturated polyester. Specific examples of polyhydric alcohol allyl ethers that contain two aliphatic hydroxyl groups and one or more allyl groups are represented by glycerine-$\alpha$-allyl ether, 2-methyl-2-allyloxymethyl-1,3-propanediol and 2,2-di(allyloxymethyl)-1,3-propanediol. Specific examples of the dicarboxylic acids are set forth hereinabove. Up to about 50 mole percent of the above acid reactant can be replaced with $\alpha,\beta$-ethylenically unsaturated dicarboxylic acids, if desired. Specific examples of suitable $\alpha,\beta$-ethylenically unsaturated dicarboxylic acids are set forth above. Small amounts of up to about 20 mole percent of polycarboxylic acids such as trimesic acid and 4-methyl-1,2,3-cyclohexanetricarboxylic acid can be substituted for a portion of the dicarboxylic acid.

The resinous reaction products of this invention are polymerizable unsaturated polyesters and can be cross-linked or cured to the insoluble, infusible state by the application of heat, preferably in the presence of a catalyst, such as a peroxide catalyst. Examples of peroxide catalysts include benzoyl peroxide, lauroyl peroxide, methyl ethyl ketone peroxide, t-butyl hydroperoxide, ascaridole, t-butyl perbenzoate, and ozonides. The amount of catalyst employed can be from about 0.5 percent to 5 percent and more by weight based on the weight of the unsaturated polyester. The resinous reaction product of unsaturated polyesters of this invention can be cross-linked or cured also by heating in air in the presence of manganese and cobalt compounds such, for example, as manganese naphthenate and cobalt naphthenate. Curing temperatures can be varied and will usually be of the order from about 20° C. to 200° C.

The polymerizable unsaturated polyesters prepared in accordance with this invention can be applied conveniently as surface coatings and the like by first dissolving them in a suitable solvent such as methanol, ethanol, isopropanol, dioxane, ethyl acetate, toluene, methylene chloride, methyl ethyl ketone, and mixtures of two or more.

Solutions can be prepared which are comprised of from about 25% to 99% of solvent and from about 75% to 1% of polymerizable unsaturated polyester. The curing or cross-linking catalyst is incorporated into the solution prior to its application. The unsaturated polyesters of this invention can also be emulsified in water and applied in this manner if desired. Application from a solvent is preferred.

The following examples are illustrative of the preparation of the unsaturated polyesters of this invention.

Example I

One hundred thirty-one grams of octyl phenoxy polyethoxy ethanol containing about 30 $-(CH_2CH_2O)-$ units (available commercially under the proprietary designation Triton X–305) is placed in a reaction vessel equipped with a stirrer, inlet for bubbling nitrogen through the reaction mass, and a receiver for collecting water liberated during reaction. The vessel is first heated to about 150° C. to distill off or remove the water present in the Triton X–305. Forty-nine grams of maleic anhydride and 53 grams of diethylene glycol are then added to the reaction vessel and the contents thereof are heated to 180° C. and maintained at this temperature for about 30 minutes. The temperature of the reaction mass is then raised to 220° C. and maintained at this temperature during which time the reaction mass is constantly stirred and nitrogen is bubbled through the reaction mass. After a period of 75 minutes the acid number of the reaction mass is about 69 and after 225 minutes the acid number is about 38. After the reaction mass reaches an acid number of about 38 it is cooled under a blanket of nitrogen gas.

The resulting reaction product is cured readily to an insoluble and infusible state when heated at 110° C. in the presence of either benzoyl peroxide or cobalt naphthenate. The amount of Tritron X-305 used in this example amounts to about 50 percent by weight of the resulting unsaturated polyester resin.

One part by weight of the resin prepared in accordance with Example I is dissolved in 99 parts by weight of butyl acetate and to the solution there is added 1 percent by weight of cobalt based on the weight of the resin. The resulting solution is applied as a coating to a film of polyethylene terephthalate. The coated film is heated at a temperature of 110° C. for 30 minutes. The resulting resin coating is highly adherent and cannot be stripped from the film with a pressure-sensitive tape. A woven fabric prepared from fibers of poly(1,4-cyclohexylenedimethylene terephthalate) is immersed in the above solution and squeezed to a wet pick-up of 100 percent. The solvent is evaporated and the coated fabric is heated at 160° C. for 10 minutes. The resulting coated fabric resists soiling by oily dirt even after repeated washings and drycleanings.

Example II

A polymerizable unsaturated polyester resin is prepared from 145.5 grams of octyl phenoxy polyethoxy ethanol containing about 40 $-(CH_2CH_2O)-$ units (available commercially under the proprietary designation Triton X–405), 33 grams of glycerine $\alpha$-allyl ether and 37 grams of phathalic anhydride by substantially the same procedure used in Example I. One-tenth gram of titanium tetraisopropoxide catalyst is added after about 43 milliliters of water is removed from the Triton X–405. The catalyst speeds up the esterification reaction. The reaction mixture is held at 220° C. for 1 hour and at 240° C. for 2 hours. The acid number of the resulting resinous reaction product is about 12. The resinous reaction product contains about 60% by weight of the Triton X–405. The resin is soluble in the solvents enumerated above and can be cured to the thermoset state by heating in the presence of a metal catalyst or a peroxide catalyst. It adheres strongly to films and fibers prepared from polyethylene terephthalate. It is useful, in its thermoset form, as an antisoiling agent on textile products and as a subbing base for gelatin and poly(vinyl alcohol) on photographic film supports.

Example III

A polymerizable unsaturated polyester resin is prepared according to the procedure described in Example II by replacing the 33 grams of glycerine-α-allyl ether with 36.5 grams of 2-methyl-2-allyloxymethyl-1,3-propanediol. A soluble, curable product is obtained similar to that obtained in Example II. The cured resin adheres strongly to films and fibers prepared from linear polyesters. A film of polyethylene-2,6-naphthalene dicarboxylate is coated by dipping in a solution containing the following ingredients:

60 parts toluene
40 parts butyl acetate
.2 part unsaturated polyester resin above
.001 part cobalt oleate The coated film is heated for 10 min. at 140° C. The cured coating is not stripped from the film by pressure sensitive tape and serves as a subbing base for gelatin. When fabric prepared from polyethylene-2,6-naphthalene dicarboxylate is coated from the above solution to give a dry pick-up of 1 percent by weight of the cured resin, it resists soiling with oily dirt.

Example IV

Twenty-five and two-tenths grams of dimethyl fumarate, 14.6 grams of dimethyl isophthalate, 36 grams of 1,4-cyclohexane dimethanol, 111 grams of the polethylene glycol ether of hydroabietyl alcohol (available commercially under the proprietary designation Synthetics AD 400) and 0.1 gram of titanium tetraisopropoxide, are placed in a reaction vessel equipped with a stirrer, means for maintaining an atmosphere of nitrogen within the reaction vessel, and means for applying reduced pressure thereto. The resulting mixture is heated with constant stirring, in a nitrogen atmosphere, at a temperature of 200° C. to effect ester interchange and to eliminate methanol reaction product. When 80 percent of the theoretical amount of methanol has been evolved, the temperature of the reaction mass is raised to 240° C. The reaction mass is held at this temperature for 30 minutes and then the pressure is reduced gradually to 1 mm. Hg pressure and held under this pressure for 15 minutes. The resulting product has an acid number of less than 1 and contains about 65 percent by weight of the polyethylene glycol ether of hydroabietyl alcohol. The resulting product can be insolubilized by heating in a presence of any of the curing catalysts enumerated above. It provides, in its cured form, an adherent coating on polyester substrate which stands up under repeated washings and drycleanings. The polymeric coating prevents the deposition of oily dirt when coated fabrics are laundered in conjunction with soiled garments.

Example V

A polymerizable unsaturated polyester is prepared in substantially the same manner as that used in Example I by heating 32.8 grams (0.2 mole) of bicycloheptene-2,3-dicarboxylic anhydride, 28.8 grams (0.2 mole) of 1,4-cyclohexanedimethanol, and 87 grams of the monolauryl ether of poly(oxyethylene) glycol containing about 30 -(CH₂CH₂O)- units. This amount of poly(oxyethylene glycol) derivative constitutes about 60% by weight of the resulting unsaturated polyester resin. An insoluble, adherent coating of this reaction product, in its cured form, on polyethylene terephthalate film can be obtained by incorporating 1% by weight of lauroyl peroxide, based on the weight of the resin, in a coating solution containing 20% solids and spraying the resulting composition on the film. The solvent used consists of equal volumes of water and isopropyl alcohol. The coating is cured by heating the treated film at 130° C. for 5 minutes. The cured coating can be used as a subbing layer for gelatin. It is possible to write on the coated film with a pen and obtain a smooth continuous line. Untreated polyethylene terephthalate film does not wet readily with water and consequently is not suitable for writing on or printing on the water-based ink.

Example VI

A polymerizable unsaturated polyester resin is prepared by heating together 540 grams of polyethylene glycol tert-dodecyl thioether containing about 9

-(CH₂CH₂O)- units (available commercially under the proprietary designation Nonic 218), 33 grams of glycerine-α-allyl ether, 14.8 grams of phthalic anhydride, 9.8 grams of maleic anhydride, and 8.3 grams of isophthalic acid by the procedure described in Example I. The resinous reaction product contains about 90 percent by weight of the poly(oxyethylene glycol) derivative. A coating of the cured resin (cured or crosslinked by using benzoyl peroxide curing catalyst) on a fabric prepared from fibers of polyethylene terephthalate prevents the deposition thereon of oily dirt even after 5 washing cycles in the same load with soiled cotton fabric swatches. The amount of resin applied to the fabric is 2 percent by weight, based on the weight of the fabric. Untreated polyethylene terephthalate fabric is badly soiled after one washing cycle with soiled cotton fabric swatches.

Example VII

Twenty grams of the poly(oxyethylene glycol) derivative,

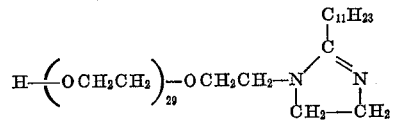

prepared according to U.S. Patent 3,056,688, 49 grams of maleic anhydride, 73 grams of 2,2,4-trimethyl-1,3-pentanediol, and .03 gram of dibutyl tin oxide are placed in a reaction vessel equipped with stirrer, inlet for bubbling nitrogen through the reaction mass, and receiver for collecting water liberated during the reaction. The dibutyl tin oxide functions as an esterification catalyst. The contents of the vessel are heated to 180° C. and maintained at this temperature for 90 minutes. The temperature of the reaction mixture is then raised to 230° C. over a period of 60 minutes. After 5 hours at 230° C. with constant stirring and nitrogen bubbling through the mixture, the acid number is about 50. The resulting polymerizable unsaturated polyester resin is cooled under a blanket of nitrogen gas. It contains about 15 percent by weight of the poly(oxyethylene glycol) derivative. It can be cured to an insoluble state by heating in the presence of a metal catalyst or a peroxide catalyst. The resin, in its cured form, forms a durable, adherent coating on shaped objects of linear polyesters.

Example VIII

A polymerizable unsaturated polyester resin is prepared from 145.5 grams of an ethylene oxide condensate of tallow acid amides (available commercially under the proprietary designation Ethomid HT/60), 33 grams of glycerine-α-allyl ether and 37 grams of phthalic anhydride by heating in the presence of 0.1 gram of titanium tetraisopropoxide with a slow stream of nitrogen gas bubbling through the reaction mass. The heating schedule is 130° C. for 1 hour, 180° C. for 1 hour, 220° C. for 1 hour, and 240° C. for 2 hours. The resinous reaction product contains about 60% by weight of the Ethomid HT/60. The resin can be cured to an insoluble state by heating in the presence of a metal catalyst or a peroxide catalyst.

An adherent coating that can be written on with pencil can be obtained by incorporating a finely divided pigment in the resin of Example VIII. For example, a coating composition is prepared in butyl acetate containing 0.5% by weight of the resinous reaction product of Example VIII, 0.05% by weight of finely divided calcium silicate, 0.005% by weight of benzoyl peroxide, and 0.0003% by weight of cobalt, present as cobalt oleate. Polyethylene terephthalate film is coated with this composition and the applied coating is cured by heating at 130° C. for 5 minutes. A transparent, adherent coating is obtained which can be written on with pen or pencil.

Example IX

A polymerizable unsaturated polyester resin is prepared by heating together 28 grams of itaconic anhydride, 23.4 grams of 2,2-dimethyl-1,3-propanediol, 1.4 grams of pentaerythritol, and 111 grams of the poly(oxyethylene glycol) derivative

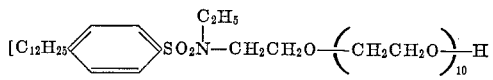

prepared according to British Patent 380,851], in substantially the same manner as that described in Example VII. The resulting reaction product is soluble in butyl acetate, methyl ethyl ketone, chlorinated hydrocarbon solvents, and aromatic hydrocarbon solvents. The resulting reaction product contains about 70 percent by weight of the poly(oxyethylene glycol) derivative of N-ethyl-p-dodecyl-sulfonamide. It can be cured to an insoluble state by heating in the presence of one of the above enumerated catalysts. The resin, in its cured form, forms a durable antisoiling finish on linear polyester textile products.

Example X

A polymerizable unsaturated polyester resin is prepared from 31.5 grams of polyethylene glycol dinonylamine containing about 20 $(CH_2CH_2O)$ units, 40.4 grams of 2,2-di(allyloxymethyl)-1,3-propanediol, and 40.4 grams of sebacic acid by substantially the same procedure used in Example II. The polyethylene glycol dinonylamine has the structure,

and is prepared according to the general directions in British Patent 380,851. The resinous reaction product contains about 30 percent by weight of the poly(oxyethylene glycol) derivative. The resin is soluble in the previously enumerated solvents and can be cured to the thermoset state by heating in the presence of a metal catalyst or a peroxide catalyst. It adheres strongly to films and fibers prepared from linear polyesters.

Example XI

A product similar to that obtained in Example X is prepared by replacing the $(C_9H_{19})_2N(CH_2CH_2O)_{20}H$ with 31.5 grams of

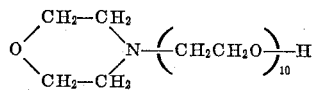

The latter derivative is obtained by reacting morpholine with ethylene oxide according to the general procedure described in British Patent 380,851.

As above set forth, the novel resinous reaction products of this invention are adapted particularly for the application of hydrophilic coatings on the surfaces of articles prepared from polyesters and particularly polyester fibers, fabrics prepared from polyester fibers, and polyester sheet material, such as film and the like. When applied to polyester textile fibers it is applied in an amount of from about .1% to 10% by weight based on the weight of the fiber.

Polyesters that can be treated with the novel unsaturated polyester of this invention can be most advantageously derived from terephthalic acid, 4,4'-sulfonyldibenzoic acid, 2,6-naphthalene dicarboxylic acid, 4,4'-diphenic acid, 1,2-di(p-carboxyphenyl)ethane, 1,2-di(p-carboxyphenoxy)-ethane, 4,4'-dicarboxy-diphenyl ether, and the various esters of these acids such as the lower alkyl diesters. These compounds can be generically grouped as hexacarbocyclic nuclear dicarboxylic bifunctional compounds wherein the carboxyl radicals are nuclearly situated in a para relationship. Such compounds can be reacted in accordance with well-known techniques, illustrated in numerous patents, with bifunctional glycols containing from 2 to 10 carbon atoms. Examples of such glycols include ethylene glycol, tetramethylene glycol, 2,2,4,4-tetramethyl-1,3-cyclobutanediol, pentamethylene glycol, neopentyl glycol, 1,4-cyclohexanedimethanol, quinitol, and 1,4-bis(hydroxyethyl) benzene. Illustrative of the more advantageous polyesters are poly(ethylene terephthalate), the polyester derived from pentamethylene glycol and 4,4'-sulfonyldibenzoic acid, the polyester from 1,4-cyclohexanedimethanol and terephthalic acid and various modified polyesters related thereto such, for example, as those wherein up to 30 mole percent of another aromatic dicarboxylic acid or an aliphatic dicarboxylic acid is employed as a modifier.

Another valuable class of polyesters that can be successfully treated by the process of the invention are those obtained from compounds that contain two aromatic hydroxy groups. These include the polycarbonates and the dicarboxylic acid polyesters of compounds containing two aromatic hydroxy groups having the structure

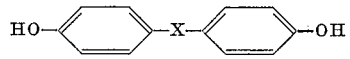

wherein X is an alkylene or cyclic alkylene radical. The term polycarbonate covers a family of resins well known in the art. These resins are derived from aromatic dihydroxy compounds as above set forth and carbonic acid. A specific polycarbonate is that derived from phosgene and bisphenol A, which is 4,4'-dihydroxy diphenyl propane. The resulting polymer can be considered an ester of carbonic acid and bisphenol A. Many esters of carbonic acid and other dihydroxy compounds as above set forth have been prepared.

It is to be understood that the above description and examples are illustrative of this invention and not in limitation thereof.

We claim:
1. A composite structure comprised of a shaped structure of a high-melting, crystalline, linear polyester and a highly adherent coating on the surface thereof, said coating consisting of a cured, cross-linked polyester essentially derived from the following constituents:
(A) at least one polyhydric alcohol
(B) at least one dicarboxylic compound, and
(C) from 15 to 90% by weight, based on said cured polyester, of a poly(oxyethylene) monohydric alcohol having at least 5 oxyethylene groups wherein at least 30 mole percent of the combination of said constituents (A) and (B) has ethylenic unsaturation.

2. A composite structure as defined by claim 1 wherein said constituent (A) is a member selected from the group consisting of polyhydric alcohols having from 2 to 5 hydroxy radicals and having from 2 through 20 carbon atoms and ethers thereof having at least two free hydroxy radicals, said constituent (B) is a member selected from the group consisting of aliphatic dicarboxylic acids having from 4 to 10 carbon atoms and their anhydrides and their lower alkyl esters, alicyclic dicarboxylic acids having from 4 to 10 carbon atoms and their anhydrides and their lower alkyl esters, and aromatic dicarboxylic acids having from 6 to 24 carbon atoms and their anhydrides and their lower alkyl esters, and said constituent (C) is a member selected from the group consisting of monohydric alcohols having the following formula:

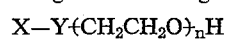

wherein $n$ is an integer of from 5 to about 100, Y represents a member selected from the group consisting of —O—, —S—, —CO—NH—, and =N— linkages, and X represents a member selected from the group consisting of monovalent organic radicals having from 1 to 40 carbon atoms and divalent organic radicals having from 4 to 40 carbon atoms both valences of which are connected to the same nitrogen atom, said organic radical X may contain one or more heteroatoms selected from the group consisting of O, N, S, and halogen.

3. A composite structure as defined by claim 1 wherein said ethylenic unsaturation is primarily present as an $\alpha,\beta$-ethylenically unsaturated dicarboxylic compound.

4. A composite structure as defined by claim 1 wherein said ethylenic unsaturation is primarily present as a polyhydric alcohol having at least two free hydroxyl radicals and at least one allyloxy radical.

5. A composite structure as defined by claim 1 wherein the poly(oxyethylene) monohydric alcohol is octyl phenoxy polyethoxy ethanol containing about 30 ethoxy units.

6. A composite structure as defined by claim 1 wherein the poly(oxyethylene) monohydric alcohol is octyl phenoxy polyethoxy ethanol containing about 40 ethoxy units.

7. A composite structure as defined by claim 1 wherein said high-melting, crystalline, linear polyester is poly(ethylene terephthalate).

8. A composite structure as defined by claim 2 wherein said high-melting, crystalline, linear polyester is poly(ethylene terephthalate).

9. A composite structure as defined by claim 3 wherein said high-melting, crystalline, linear polyester is poly(ethylene terephthalate).

10. A composite structure as defined by claim 4 wherein said high-melting, crystalline, linear polyester is poly(ethylene terephthalate).

11. A composite structure as defined by claim 5 wherein said high-melting, crystalline linear polyester is poly(ethylene terephthalate).

12. A composite structure as defined by claim 6 wherein said high-melting, crystalline, linear polyester is poly(ethylene terephthalate).

13. A composite structure as defined by claim 7 wherein said poly(ethylene terephthalate) is in the form of a film.

14. A composite structure as defined by claim 7 wherein said poly(ethylene terephthalate) is in the form of a fiber.

References Cited

UNITED STATES PATENTS

| | | | |
|---|---|---|---|
| 2,952,652 | 9/1960 | Beindorff et al. | 260—30.6 |
| 3,060,152 | 10/1962 | Ringwald | 260—75 |
| 3,284,232 | 11/1966 | Caldwell | 117—138.8 |
| 3,309,222 | 3/1967 | Caldwell | 117—138.8 |

WILLIAM H. SHORT, Primary Examiner

L. L. LEE, Assistant Examiner

U.S. Cl. X.R.

117—161; 260—47, 75